(12) United States Patent
Arimilli et al.

(10) Patent No.: US 6,460,118 B1
(45) Date of Patent: Oct. 1, 2002

(54) SET-ASSOCIATIVE CACHE MEMORY HAVING INCREMENTAL ACCESS LATENCIES AMONG SETS

(75) Inventors: Ravi Kumar Arimilli; Lakshminarayana Baba Arimilli, both of Austin; John Steven Dodson, Pflugerville; James Stephen Fields, Jr.; Guy Lynn Guthrie, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/339,410

(22) Filed: Jun. 24, 1999

(51) Int. Cl.[7] .................................................. C06F 12/00
(52) U.S. Cl. .......................... 711/128; 711/122; 365/49
(58) Field of Search .................................. 711/128, 151, 711/122, 121; 365/49, 50

(56) References Cited

U.S. PATENT DOCUMENTS

| | | | | |
|---|---|---|---|---|
| 4,823,259 A | * | 4/1989 | Aichelmann, Jr. et al. | 711/122 |
| 5,276,848 A | * | 1/1994 | Gallagher et al. | 711/121 |

* cited by examiner

*Primary Examiner*—Matthew Kim
*Assistant Examiner*—Matthew D. Anderson
(74) *Attorney, Agent, or Firm*—Casimer K. Salys; Bracewell & Patterson, L.L.P.

(57) ABSTRACT

A set-associative cache memory having incremental access latencies among sets is disclosed. The cache memory has multiple congruence classes of cache lines. Each congruence class includes a number of sets organized in a set-associative manner. In accordance with a preferred embodiment of the present invention, the cache memory further includes a means for accessing each of the sets with an access time dependent on a relative location of each of the sets such that access latency varies incrementally among sets.

10 Claims, 4 Drawing Sheets

SET-ASSOCIATIVE CACHE MEMORY HAVING INCREMENTAL ACCESS LATENCIES AMONG SETS

RELATED PATENT APPLICATIONS

The present patent application is related to copending application U.S. Ser. No. 09/339,411, filed on even date, and copending application U.S. Ser. No. 09/339,409, filed on even date.

BACKGROUND OF THE INVENTION

1. Technical Field

The present invention relates to cache memories in general, and in particular to set associative cache memories. Still more particularly, the present invention relates to a set associative cache memory having incremental access latencies among sets.

2. Description of the Prior Art

In order to increase the speed of access to data stored within a main memory, modern data processing systems generally maintain the most recently used data in a high-speed memory known as a cache memory. This cache memory has multiple cache lines, with several bytes per cache line for storing information in contiguous addresses within the main memory. In addition, each cache line has an associated tag that typically identifies a partial address of a corresponding page of the main memory. Because the information within each cache line may come from different pages of the main memory, the tag provides a convenient way to identify to which page of the main memory the information within a cache line belongs.

In a typical cache memory implementation, information is stored in one or several memory arrays. In addition, the corresponding tags for each cache line are stored in a structure known as a directory or tag array. Usually, an additional structure, called a translation lookaside buffer (TLB), is utilized to facilitate the translation of an effective address to a real address during a cache memory access.

In order to access a byte in a cache memory with an effective address, the mid-order bits, for example, of the effective address are utilized to select a cache line from the memory array along with a corresponding tag from the directory. The low-order bits, for example, of the effective address are then utilized to choose the indicated byte from the selected cache line. At the same time, the high-order bits, for example, of the effective address are translated via the translation lookaside buffer to determine a real page number. If the real page number obtained by this translation matches the real address tag stored within the directory, then the data read from the selected cache line is the data actually sought by a processing unit. This is commonly referred to as a cache "hit," meaning the requested data was found in the cache memory. If the real address tag and translated real page number do not agree, a cache "miss" occurs, meaning that the requested data was not stored in the cache memory. Accordingly, the requested data have to be subsequently retrieved from the main memory or elsewhere within the memory hierarchy.

With a direct-mapped cache, only one of the group of corresponding lines from all pages in a real memory page can be stored in the cache memory at a time; but in order to achieve a better "hit" ratio, sometimes a set-associative cache is utilized instead. For example, with an N-way set-associative cache, corresponding lines from N different pages may be stored. Since all entries can be distinguished by their associated tags, it is always possible to resolve which of the N lines having the same line number contains the requested information. The resolution requires comparison of the translated real page number to the N tags associated with a given line number. Each comparison generates an input to an N-to-1 multiplexor to select an appropriate cache line from among the N possibilities. In order to achieve a high parallelism and uniformity, according to the prior art cache architecture, the layout and wiring of an N-way set-associative cache are fashioned in such a manner that the access time to each set within the cache is identical.

SUMMARY OF THE INVENTION

A cache memory has multiple congruence classes of cache lines. Each congruence class includes a number of sets organized in a set-associative manner. In accordance with a preferred embodiment of the present invention, the cache memory further includes a means for accessing each of the sets with an access time dependent on a relative location of each of the sets such that access latency varies incrementally among sets.

All objects, features, and advantages of the present invention will become apparent in the following detailed written description.

DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

The present invention may be implemented in a variety of processors having a cache memory. The cache memory may be, for example, a primary cache, a secondary cache, or a tertiary cache.

Figure 1:
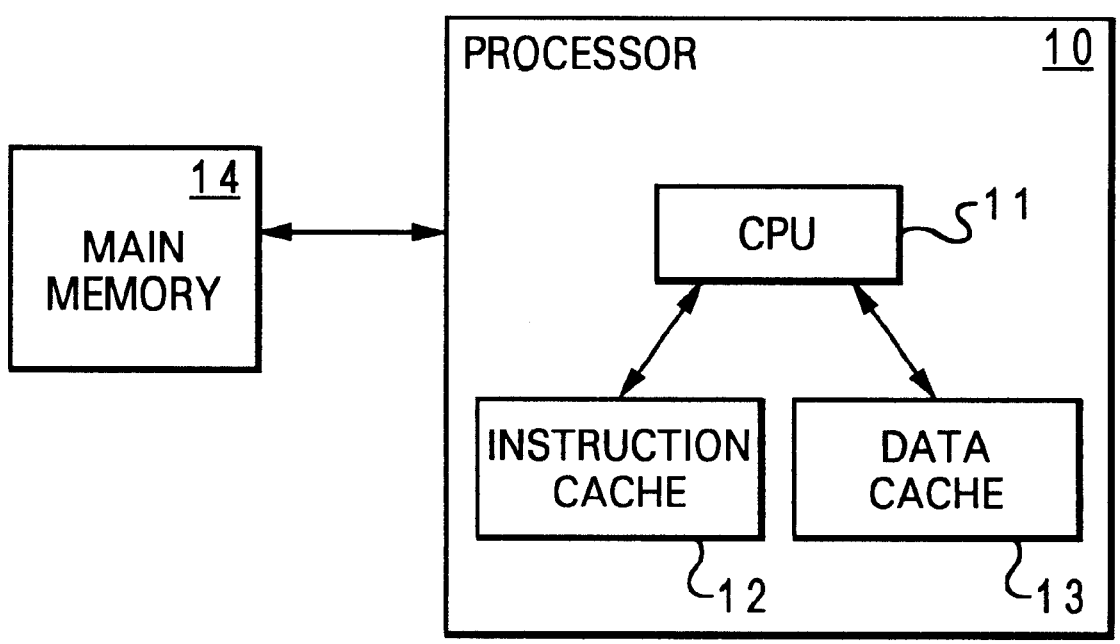
FIG. 1 is a block diagram of a general structure of a processor in accordance with a preferred embodiment of the invention.

Referring now to the drawings and in particular to FIG. 1, there is depicted a block diagram of a general structure of a processor in accordance with a preferred embodiment of the invention. As shown, processor 10 includes a central processing unit (CPU) 11, an instruction cache 12, and a data cache 13. CPU 11 is preferably connected to instruction cache 12 and data cache 13 via respective high bandwidth buses. Processor 10 is also coupled to a main memory 14. Both instruction cache 12 and data cache 13 are high speed set-associative caches which enable processor 10 to achieve a relatively fast access time to a subset of instructions or data previously transferred from main memory 14.

Figure 2:
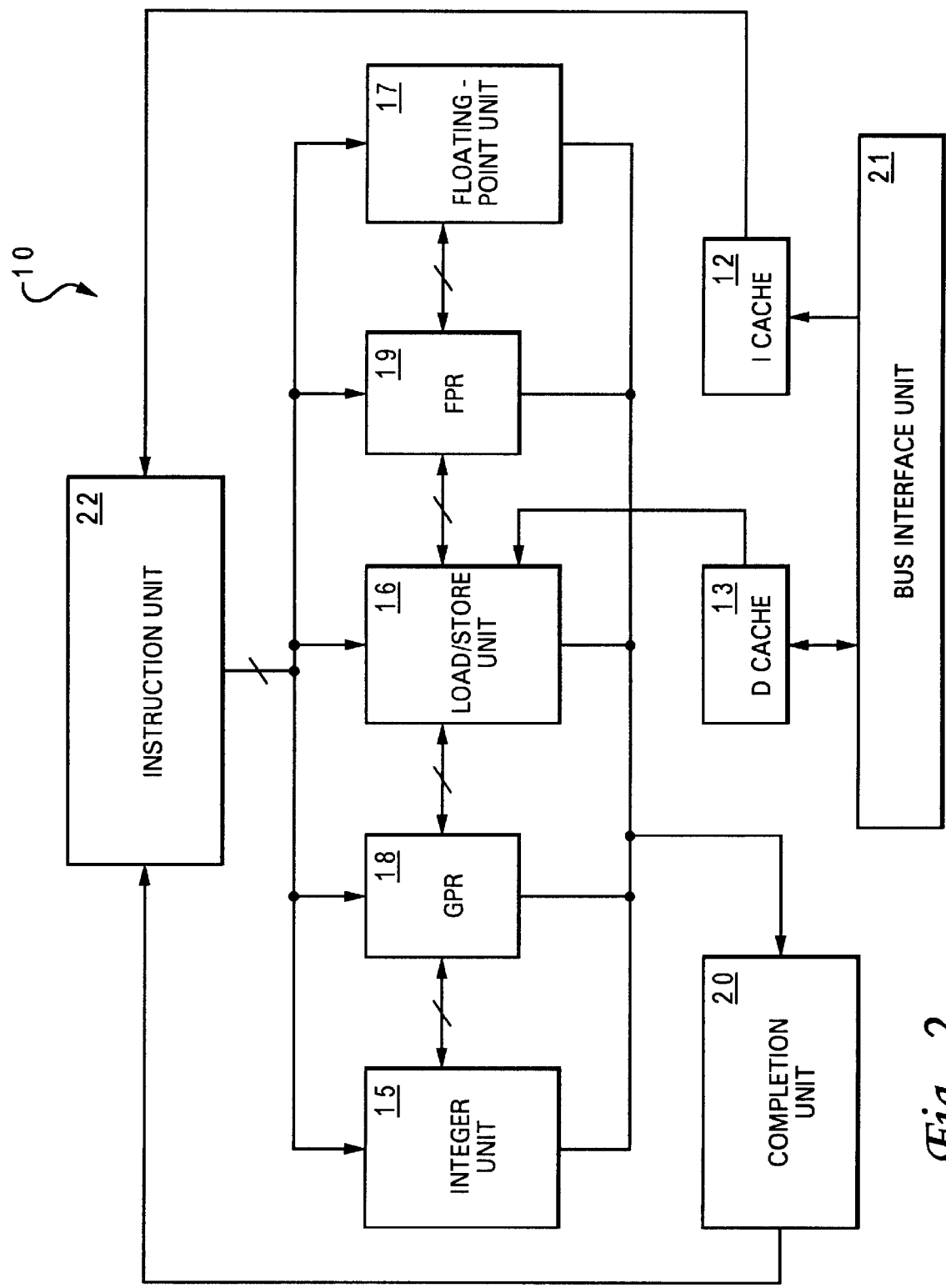
FIG. 2 is a detailed block diagram of the processor from FIG. 1, in accordance with a preferred embodiment of the present invention.

With reference now to FIG. 2, there is depicted a detailed block diagram of processor 10 in accordance with a preferred embodiment of the present invention. Within processor 10, a bus interface unit 21 is coupled to instruction cache 12 and data cache 13. Instruction cache 12 is further coupled to an instruction unit 22 which fetches instructions from instruction cache 12 during each execution cycle.

Processor 10 also includes at least three execution units, namely, an integer unit 15, a load/store unit 16, and a floating-point unit 17. These three execution units are collectively known as CPU 11 as depicted in FIG. 1. Each of execution units 15–17 can execute one or more classes of instructions, and all execution units 15–17 can operate concurrently during each processor cycle. After execution of an instruction has terminated, any of execution units 15–17 stores data results to a respective rename buffer, depending upon the instruction type. Then, any one of execution units 15–17 may signal a completion unit 20 that the execution of an instruction has finished. Finally, each instruction is completed in program order, and the result data are transferred from a respective rename buffer to a general purpose register 18 or a floating-point register 19, accordingly.

Figure 3:
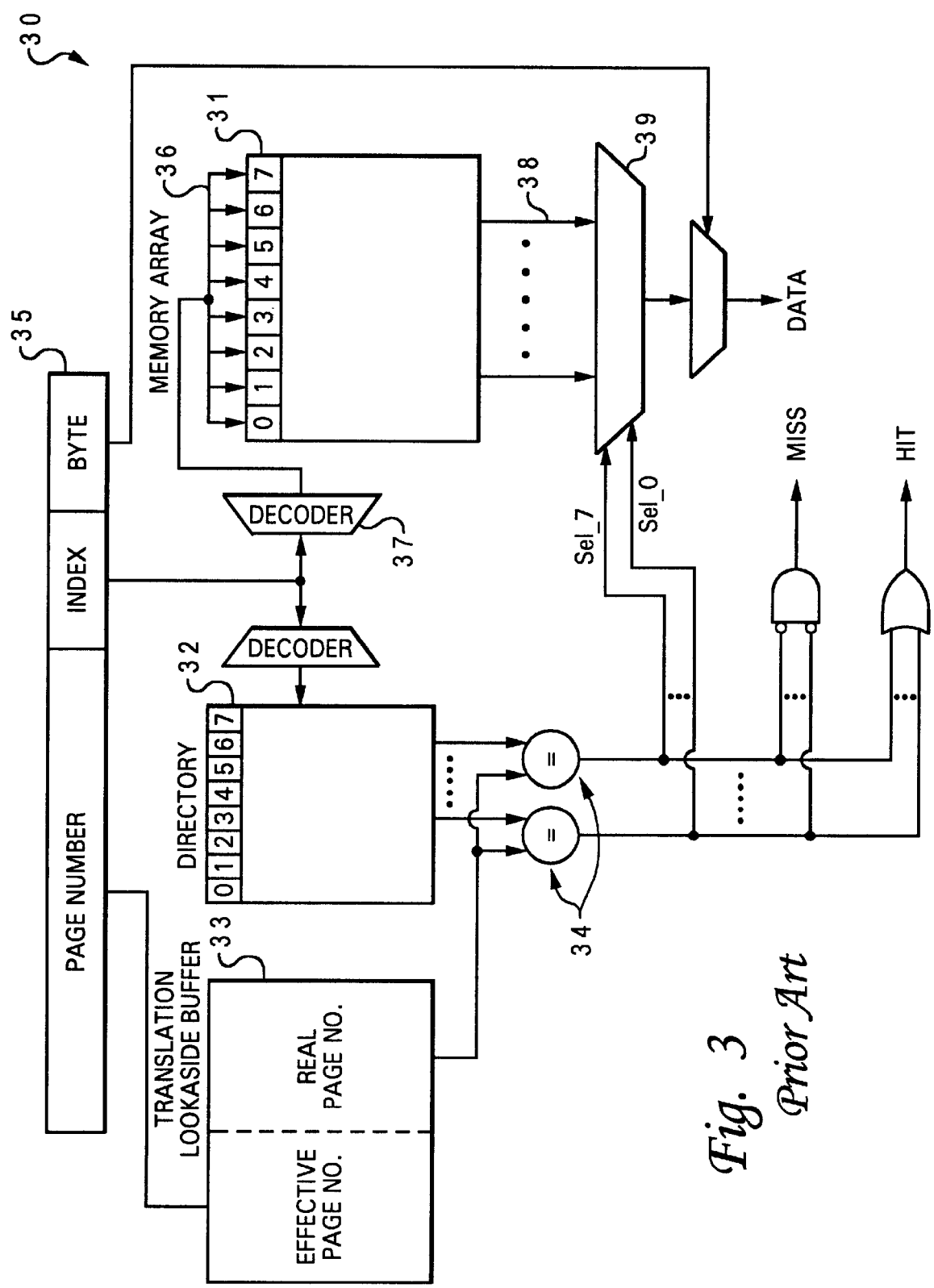
FIG. 3 is a block diagram of a set-associative cache memory according to the prior art.

Referring now to FIG. 3, there is illustrated a block diagram of a set-associative cache memory according to the prior art. As shown, a set-associative cache memory 30 includes a memory array 31 along with a directory 32, both of which are divided into eight sets, namely, set 0 through set 7. Each cache line in memory array 31 has a corresponding row in directory 32. The data or instructions portion of a cache line is maintained in memory array 31 while the tag portion of the same cache line is maintained in directory 32. Also shown in FIG. 3 is a translation lookaside buffer (TLB) 33 for translating an effective address to a corresponding real address. Specifically, TLB 33 translates the page number portion of an effective address (or effective page number) to a corresponding real page number.

The information stored in memory array 31 may be accessed by an effective address 35. Effective address 35 includes a byte field, an index field, and a page number field. The index field of effective address 35 is utilized to select a specific congruence class within memory array 31, and the byte field of effective address 35 is utilized to index a specific byte within a selected cache line. In addition, the page number field of effective address 35 is sent to TLB 33 to be translated to a corresponding real page number. This real page number is utilized for comparison with each tag of the selected congruence class from directory 32 via comparators 34 in order to determine whether there is a cache "hit" or "miss." Incidentally, a match between a tag from one of the eight ways in directory 32 and the real page number implies a cache "hit."

In order to achieve high parallelism and uniformity within cache memory 30, the layout and wiring of memory array 31 are fashioned in such a manner that the access time to each set within memory array 31 is identical. For example, as shown in FIG. 3, fanout wiring 36 from a decoder 37 for accessing memory array 31 are evenly distributed (having equal distances) across all eight sets within memory array 31. Similarly, output wiring 38 from memory array 31 are also evenly distributed (having equal distances) from all eight sets to a multiplexor 39. As a result, the latency for a cache access is the same for each of the eight sets within memory array 31, regardless of the set in which the instruction or data is being stored.

Figure 4:
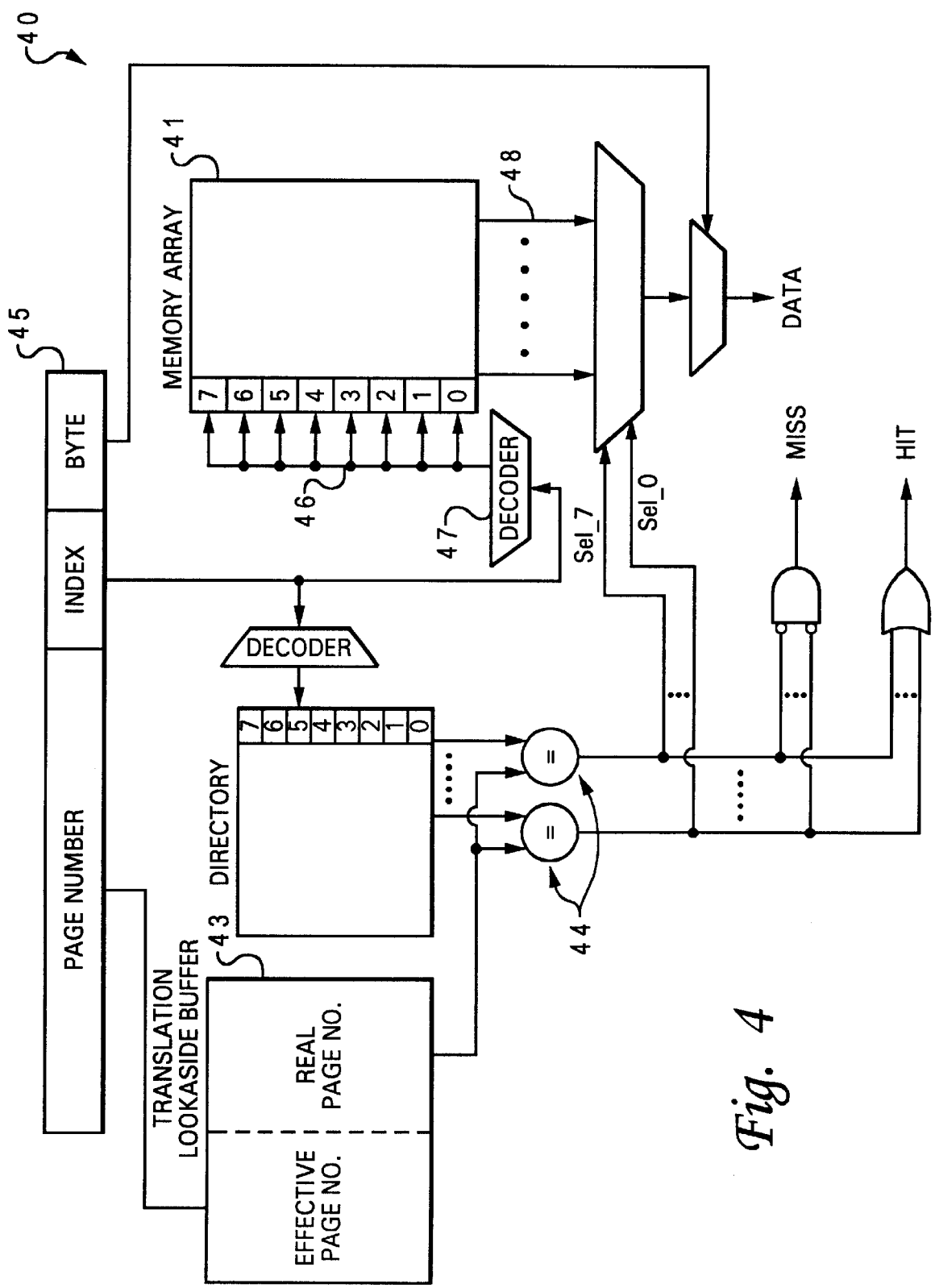
FIG. 4 is a block diagram of a set-associative cache memory in accordance with a preferred embodiment of the present invention.

With reference now to FIG. 4, there is depicted a block diagram of a set-associative cache memory in accordance with a preferred embodiment of the present invention. As shown, a set-associative cache memory 40 includes memory array 41 along with a directory 42. Set-associative cache memory 40 may be an instruction cache, such as instruction cache 12 in FIG. 2, or a data cache, such as data cache 13 in FIG. 2. Each cache line in memory array 41 has a corresponding row in directory 42. The data or instructions portion of a cache line is maintained in memory array 41 while the tag portion of the same cache line is maintained in directory 42. Cache memory 40 also includes a TLB 43 for translating an effective address to a corresponding real address.

For the purpose of illustration, cache memory 40 is an eight-way set-associative cache memory. As a preferred embodiment of the present invention, fanout wiring 46 from a decoder 47 for accessing memory array 41 are incrementally distributed (having distances incrementally increased) across all eight sets within memory array 41. Each set within memory array 41 is positioned with an incremental distance from address decoder 47 as well as output wiring 48. For example, as shown in memory array 41 of FIG. 4, set 0 is proportionally closer to address decoder 47 than set 1, set 1 is proportionally closer to address decoder 47 than set 2, set 2 is proportionally closer to address decoder 47 than set 3, etc. Similarly, set 0 is proportionally closer to output wiring 48 than set 1, set 1 is proportionally closer to output wiring 48 than set 2, set 2 is proportionally closer to output wiring 48 and than set 3, etc. Hence, the length of wiring from address decoder 47 to each set within memory array 41 is directly proportional to the distance between address decoder 47 and the set, and the length of the wiring from each set within memory array 41 to the output of memory array 41 is directly proportional to the distance between the set and the output of memory array 41. As a result, the latency for a cache access is different for each of the eight sets within memory array 41, depending on the set in which the instruction or data is being stored. In other words, there is an incremental access latency among sets, from the fastest set 0 to the slowest set 7.

The information stored in memory array 41 may be accessed by an effective address 45. Effective address 45 includes a byte field, an index field, and a page number field. The index field of effective address 45 is utilized to select a specific congruence class within memory array 41, and the byte field of effective address 45 is utilized to index a specific byte within a selected cache line. In addition, the page number field of effective address 45 is sent to TLB 43 to be translated to a corresponding real page number. This real page number is utilized for comparing with each tag of the selected congruence class from directory 42 via comparators 44 in order to determine whether there is a cache "hit" or "miss." Incidentally, a match between a tag from one of two ways in directory 42 and the real page number implies a cache "hit."

As has been described, the present invention provides a set associative cache memory having incremental access latencies among sets. Although eight ways are shown in the present disclosure, it is understood by those skilled in the art that the number of ways can be any number higher than one. With the present invention, there will be a speed improvement when the required information is resided within those sets that are closer to the output of the memory array.

While the invention has been particularly shown and described with reference to a preferred embodiment, it will be understood by those skilled in the art that various changes in form and detail may be made therein without departing from the spirit and scope of the invention.

What is claimed is:

1. A cache memory, comprising:
   a plurality of congruence classes of cache lines, wherein each of said congruence classes includes a plurality of sets organized in a set-associative manner; and means for accessing each of said plurality of sets within said cache memory with an access time dependent on a relative location of each of said plurality of sets within said cache memory such that access latency varies incrementally among said plurality of sets within said cache memory.

2. The cache memory according to claim 1, wherein said means for accessing further includes fanout wiring incrementally distributed between an address decoder and each of said plurality of sets.

3. The cache memory according to claim 1, wherein said means for accessing further includes output wiring incrementally distributed between each of said plurality of sets and an output.

4. The cache memory according to claim 1, wherein said cache memory is a primary cache.

5. The cache memory according to claim 1, wherein said cache memory is a secondary cache.

6. A processor, comprising:

a central processing unit; and a cache memory coupled to said central processing unit, wherein said cache memory includes:

a plurality of congruence classes of cache lines, wherein each of said congruence classes includes a plurality of sets organized in a set-associative manner; and means for accessing each of said plurality of sets within said cache memory with an access time dependent on a relative location of each of said plurality of sets within said cache memory such that access latency varies incrementally among said plurality of sets within said cache memory.

7. The processor according to claim 6, wherein said means for accessing further includes fanout wiring incrementally distributed between an address decoder and each of said plurality of sets.

8. The processor according to claim 6, said means for accessing further includes output wiring incrementally distributed between each of said plurality of sets and an output.

9. The processor according to claim 6, wherein said cache memory is a primary cache.

10. The processor according to claim 6, wherein said cache memory is a secondary cache.

* * * * *